United States Patent
Xu et al.

(10) Patent No.: US 10,582,427 B2
(45) Date of Patent: *Mar. 3, 2020

(54) METHOD AND APPARATUS FOR HANDLING E-RAB SWITCH PROBLEM FOR DUAL CONNECTIVITY IN WIRELESS COMMUNICATION SYSTEM

(71) Applicant: LG ELECTRONICS INC., Seoul (KR)

(72) Inventors: Jian Xu, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/183,002

(22) Filed: Nov. 7, 2018

(65) Prior Publication Data
US 2019/0098538 A1 Mar. 28, 2019

Related U.S. Application Data

(63) Continuation of application No. 15/509,157, filed as application No. PCT/KR2015/010859 on Oct. 14, 2015, now Pat. No. 10,172,166.
(Continued)

(51) Int. Cl.
*H04W 76/06* (2009.01)
*H04W 36/14* (2009.01)
(Continued)

(52) U.S. Cl.
CPC ... *H04W 36/0033* (2013.01); *H04W 36/0055* (2013.01); *H04W 36/14* (2013.01);
(Continued)

(58) Field of Classification Search
CPC ......... H04W 36/0033; H04W 36/0055; H04W 36/14; H04W 48/18; H04W 76/062; H04W 76/064; H04W 76/34; H04W 76/32
(Continued)

(56) References Cited

U.S. PATENT DOCUMENTS 8,125,889 B2 * 2/2012 Hu ...................... H04L 12/4633
370/216
9,131,477 B2 * 9/2015 Singh .................... H04L 1/1867
(Continued)

FOREIGN PATENT DOCUMENTS

| CN | 102170667 | | 8/2011 | |
| CN | 102170667 A | * | 8/2011 | ............ H04W 36/12 |
| WO | 2014109606 | | 7/2014 | |

OTHER PUBLICATIONS

3GPP TSG-WG3 Meeting #85, R3-142093; Reply LS on S1-U tunnel switch for Dual Connectivity, R3-141558 / C4-141621, Rel-12, RAN3; Mingzeng Dai; Dresden, Germany; Aug. 18-22, 2014. p. 1-2.*
(Continued)

*Primary Examiner* — Mahendra R Patel
(74) *Attorney, Agent, or Firm* — Lee Hong Degerman Kang Waimey

(57) ABSTRACT

A method and apparatus for handling evolved universal terrestrial radio access network (E-UTRAN) radio access bearer (E-RAB) switch failure for dual connectivity in a wireless communication system is provided. A master evolved NodeB (MeNB) in dual connectivity receives an E-RAB modification confirm message including a list of E-RABs failed to be modified from a mobility management entity (MME). The MeNB may keep old general packet ratio service (GPRS) tunneling protocol (GTP) tunnels for the failed E-RABs, and trigger a secondary eNB (SeNB) release
(Continued)

procedure or a SeNB modification procedure for releasing the failed E-RABs. Alternatively, the MeNB may trigger an E-RAB release procedure for releasing the failed E-RABs.

14 Claims, 17 Drawing Sheets

Related U.S. Application Data

(60) Provisional application No. 62/064,978, filed on Oct. 16, 2014.

(51) Int. Cl.
*H04W 36/00* (2009.01)
*H04W 76/34* (2018.01)
*H04W 48/18* (2009.01)
*H04W 76/32* (2018.01)

(52) U.S. Cl.
CPC ........... *H04W 48/18* (2013.01); *H04W 76/32* (2018.02); *H04W 76/34* (2018.02)

(58) Field of Classification Search
USPC .......................... 455/436, 437, 424; 370/242
See application file for complete search history.

(56) References Cited

U.S. PATENT DOCUMENTS

| | | | | |
|---|---|---|---|---|
| 9,398,625 B2* | 7/2016 | Sadeh | ................. | H04W 76/021 |
| 9,554,233 B2* | 1/2017 | Kim | .................... | H04W 74/085 |
| 9,686,317 B2* | 6/2017 | Pancorbo Marcos | ........................ H04L 63/102 | |
| 2001/0034228 A1* | 10/2001 | Lehtovirta | ............ | H04W 24/00 455/424 |
| 2010/0303039 A1* | 12/2010 | Zhang | .................. | H04L 5/0035 370/331 |
| 2010/0322068 A1* | 12/2010 | Grahn | .................... | H04W 76/11 370/217 |
| 2011/0274087 A1* | 11/2011 | Liang | .................... | H04W 76/34 370/331 |
| 2012/0182912 A1* | 7/2012 | Watfa | ................. | H04W 36/0022 370/311 |
| 2012/0189016 A1* | 7/2012 | Bakker | ................. | H04W 76/11 370/401 |
| 2013/0194947 A1* | 8/2013 | Ehsan | .................. | H04L 5/0098 370/252 |
| 2014/0080484 A1* | 3/2014 | Centonza | ............. | H04W 36/24 455/436 |
| 2014/0126532 A1* | 5/2014 | Bapat | .................... | H04W 76/25 370/331 |
| 2014/0179325 A1* | 6/2014 | Xu | .................... | H04W 36/0055 455/437 |
| 2014/0198637 A1* | 7/2014 | Shan | ................... | H04W 52/243 370/229 |
| 2014/0219248 A1* | 8/2014 | Reddiboyana | ........ | H04W 76/15 370/331 |
| 2014/0293903 A1* | 10/2014 | Kuo | ...................... | H04W 24/04 370/329 |
| 2014/0293958 A1* | 10/2014 | Teyeb | ................... | H04W 36/24 370/331 |
| 2015/0173121 A1* | 6/2015 | Miklos | .................. | H04W 76/38 370/329 |
| 2015/0181473 A1* | 6/2015 | Horn | ................. | H04W 36/0027 370/331 |
| 2015/0341494 A1* | 11/2015 | Zhou | ....................... | H04W 4/10 370/242 |
| 2016/0007255 A1* | 1/2016 | Sharma | ................. | H04W 36/08 370/331 |
| 2017/0280501 A1 | 9/2017 | Xu et al. | | |
| 2017/0303145 A1* | 10/2017 | Yang | ..................... | H04W 24/02 |

OTHER PUBLICATIONS

PCT International Application No. PCT/KR2015/010859, International Search Report dated Jan. 29, 2016, 2 pages.
3rd Generation Partnership Project; Technical Specification Group Radio Access Network; Evolved Universal Terrestrial Radio Access Network (E-UTRAN); S1 Application Protocol (S1AP) (Release 12), 3GPP TS 36.413 V12.3.0, Sep. 2014, 290 pages.
3rd Generation Partnership Project; Technical Specification Group Radio Access Network; Study on Small Cell enhancements for E-UTRA and E-UTRAN; Higher layer aspects (Release 12), 3GPP TR 36.842 V12.0.0, Dec. 2013, 71 pages.
U.S. Appl. No. 15/509,157, Notice of Allowance dated Aug. 9, 2018, 11 pages.
Japan Patent Office Application No. 2017-520475, Office Action dated Jun. 19, 2018, 2 pages.
Huawei, "TP to E-RAB Modification Indication Procedure", 3GPP TSG RAN WG3 Meeting #85bis, R3-142193, Oct. 2014, 3 pages.
LG Electronics, "Stage 3 TP for Path Switch", 3GPP TSG RAN WG3 Meeting #85bis, R3-142392, Oct. 2014, 11 pages.
European Patent Office Application Serial No. 15851258.2, Search Report dated Apr. 16, 2018, 8 pages.
Huawei, "Discussion on E-RAB Modification Indication procedure", R3-141610, 3GPP TSG RAN WG3 Meeting #85, Aug. 2014, 4 pages.
RAN3, "Reply LS on S1-U tunnel switch for Dual Connectivity", S2-142985, SA WG2 Meeting #S2-105, Oct. 2014, 1 page.
Japan Patent Office Application No. 2017-520475, Office Action dated Jan. 8, 2019, 2 pages.
NEC, Introduction of Dual Connectivity, R3-142518, 3GPP TSG-RAN WG3 Meeting #85bis, Oct. 2014, 67 pages.
The State Intellectual Property Office of the People's Republic of China Application Serial No. 201580049343.X, Office Action dated Jul. 2, 2019, 9 pages.
RAN3, "Reply LS on S1-U tunnel switch for Dual Connectivity", R3-142093, 3GPP TSG-WG3 Meeting #85, Aug. 2014, 2 pages.

* cited by examiner

METHOD AND APPARATUS FOR HANDLING E-RAB SWITCH PROBLEM FOR DUAL CONNECTIVITY IN WIRELESS COMMUNICATION SYSTEM

CROSS-REFERENCE TO RELATED APPLICATIONS

This application is a continuation of U.S. patent application Ser. No. 15/509,157, filed on Mar. 6, 2017, now U.S. Pat. No. 10,172,166, which is the National Stage filing under 35 U.S.C. 371 of International Application No. PCT/KR2015/010859, filed on Oct. 14, 2015, which claims the benefit of U.S. Provisional Application No. 62/064,978, filed on Oct. 16, 2014, the contents of which are all hereby incorporated by reference herein in their entirety.

BACKGROUND OF THE INVENTION

Field of the Invention

The present invention relates to wireless communications, and more particularly, to a method and apparatus for handling evolved universal terrestrial radio access network (E-UTRAN) radio access bearer (E-RAB) switch problem for dual connectivity in a wireless communication system.

Related Art

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

One of potential solutions for small cell enhancement, dual connectivity has been discussed. Dual connectivity is used to refer to operation where a given UE consumes radio resources provided by at least two different network points connected with non-ideal backhaul. Furthermore, each eNB involved in dual connectivity for a UE may assume different roles. Those roles do not necessarily depend on the eNB's power class and can vary among UEs. Dual connectivity may be one of potential solutions for small cell enhancement.

A secondary eNB (SeNB) may be added or modified for dual connectivity. Further, evolved universal terrestrial radio access network (E-UTRAN) radio access bearers (E-RABs) may need to be modified during the SeNB addition or modification procedure. However, in some situations, E-RAB switch failure may happen, and accordingly, a method for handling E-RAB switch failure for dual connectivity may be required.

SUMMARY OF THE INVENTION

The present invention provides a method and apparatus for handling evolved universal terrestrial radio access network (E-UTRAN) radio access bearer (E-RAB) switch problem for dual connectivity in a wireless communication system. The present invention provides a method and apparatus for receiving an E-RAB modification confirm message including a list of E-RABs failed to switch. The present invention provides a method and apparatus for keeping old transport path for the failed E-RABs and triggering a secondary evolved NodeB (SeNB) release procedure. The present invention provides a method and apparatus for triggering E-RAB release procedure for the failed E-RABs.

In an aspect, a method for handling, by a master evolved NodeB (MeNB) in dual connectivity, evolved universal terrestrial radio access network (E-UTRAN) radio access bearer (E-RAB) switch failure for dual connectivity in a wireless communication system is provided. The method includes receiving an E-RAB modification confirm message including a list of E-RABs failed to be modified from a mobility management entity (MME), keeping old general packet ratio service (GPRS) tunneling protocol (GTP) tunnels for the failed E-RABs, and triggering a secondary eNB (SeNB) release procedure or a SeNB modification procedure for releasing the failed E-RABs.

In another aspect, a method for handling, by a master evolved NodeB (MeNB) in dual connectivity, evolved universal terrestrial radio access network (E-UTRAN) radio access bearer (E-RAB) switch failure for dual connectivity in a wireless communication system is provided. The method includes receiving an E-RAB modification confirm message including a list of E-RABs failed to be modified from a mobility management entity (MME), and triggering an E-RAB release procedure for releasing the failed E-RABs.

The E-RAB switch failure can be solved efficiently.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
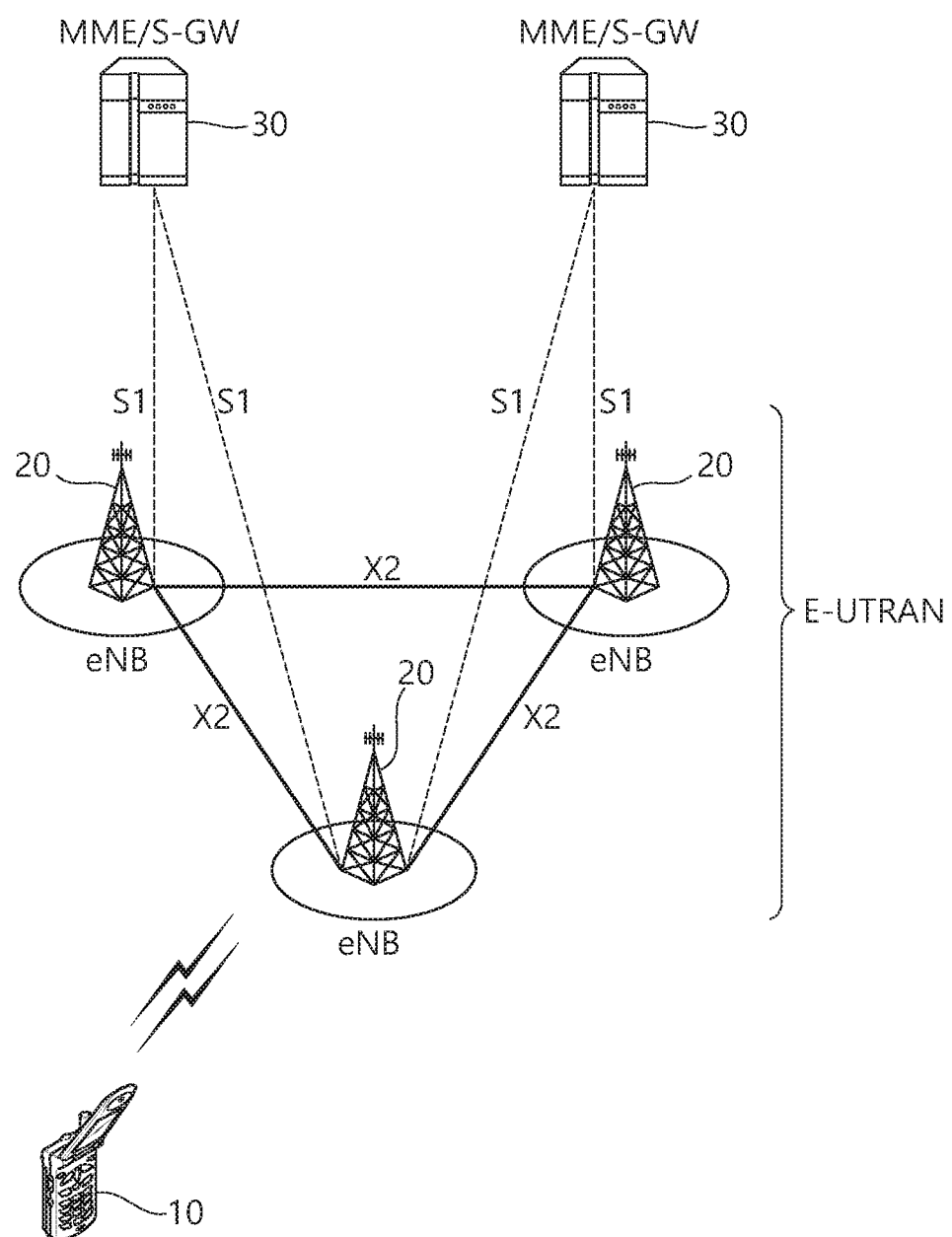
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
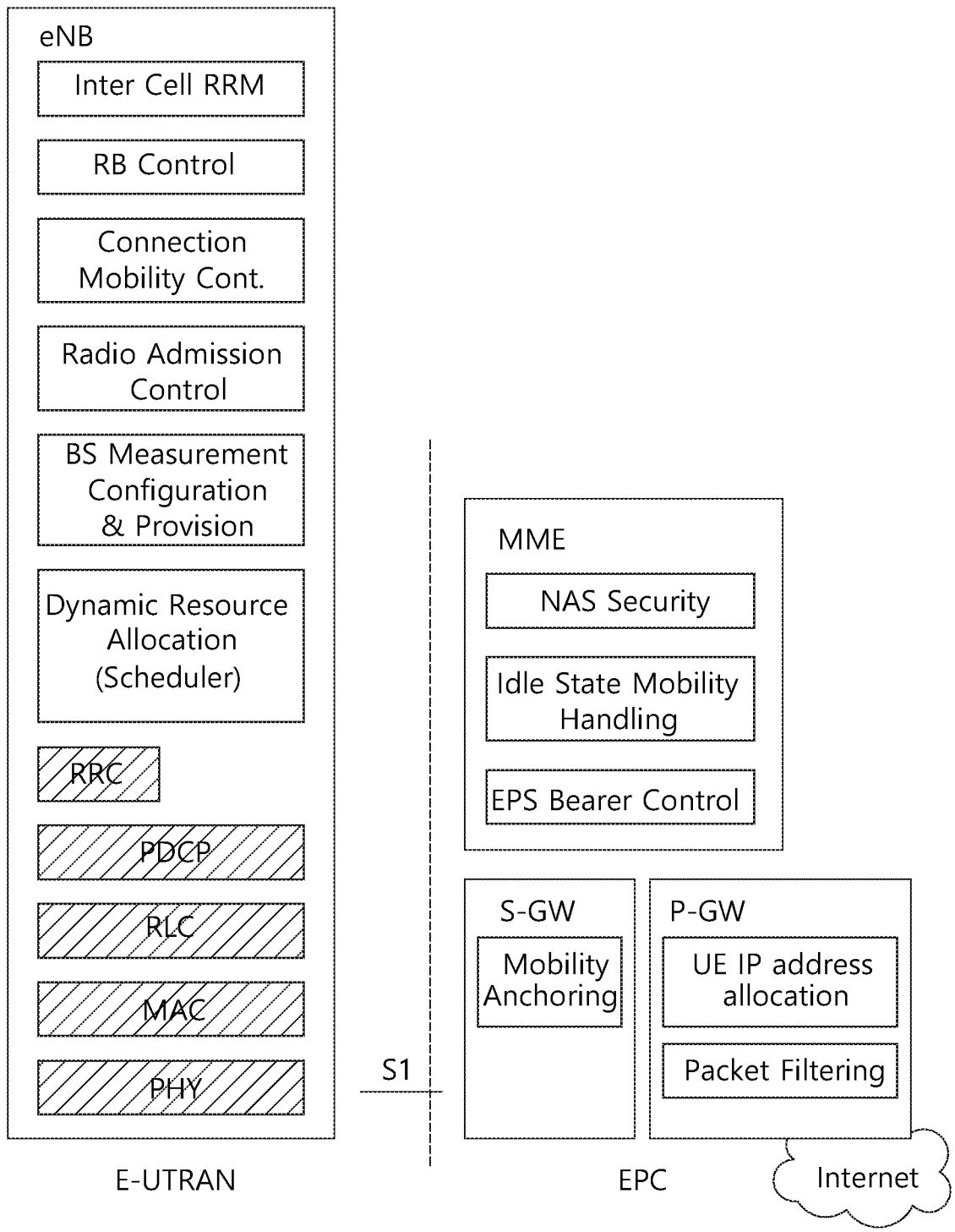
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
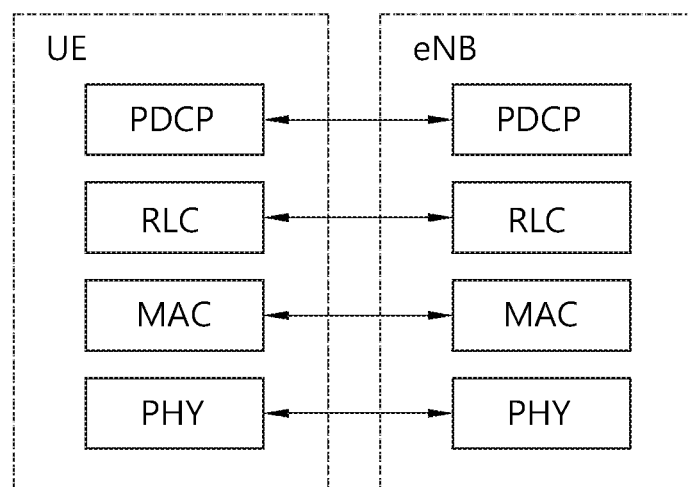
FIG. 3 shows a block diagram of a user plane protocol stack of an LTE system.
Figure 4:
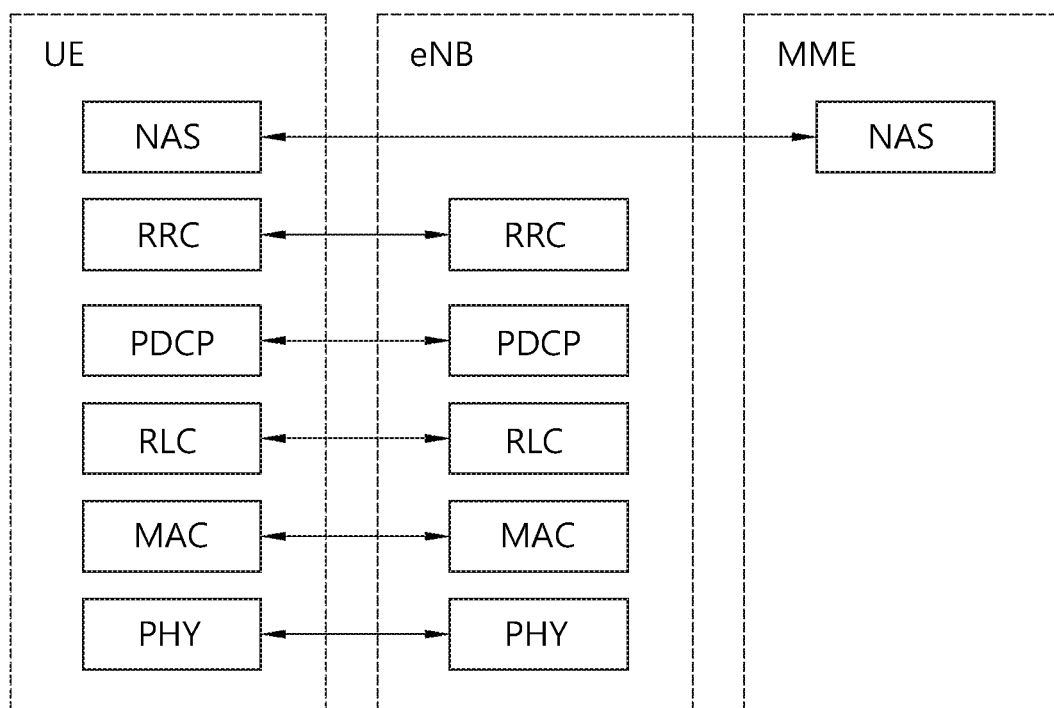
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
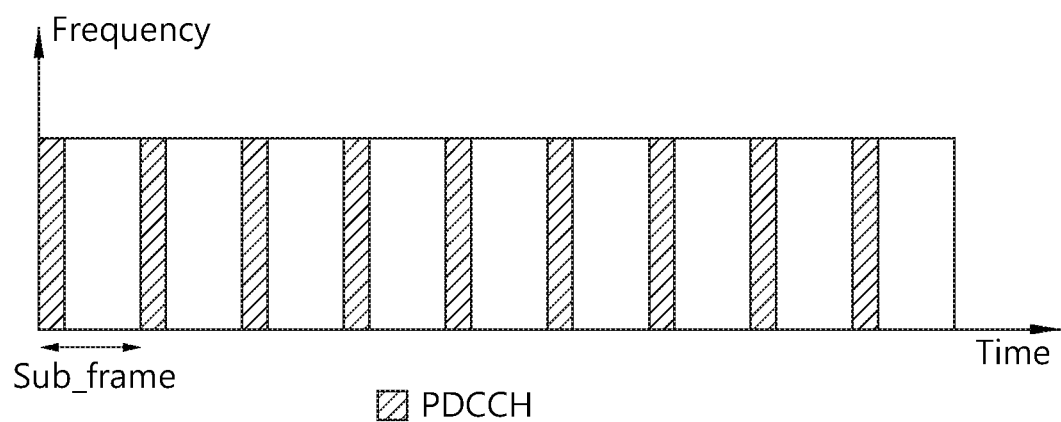
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Overall architecture and network interface for dual connectivity (DC) is described. It may be referred to 3GPP TR 36.842 V12.0.0 (2013-12). The E-UTRAN may support dual connectivity operation whereby a multiple RX/TX UE in RRC_CONNECTED is configured to utilize radio resources provided by two distinct schedulers, located in two eNBs connected via a non-ideal backhaul over the X2 interface. The overall E-UTRAN architecture described in FIG. 1 is applicable for dual connectivity as well. Two different roles may be assumed to eNBs involved in dual connectivity for a certain UE: an eNB may either act as a master eNB (MeNB) or as a secondary eNB (SeNB). The MeNB is the eNB which terminates at least S1-MME in dual connectivity. The SeNB is the eNB that is providing additional radio resources for the UE but is not the MeNB in dual connectivity. In dual connectivity a UE is connected to one MeNB and one SeNB.

Figure 6:
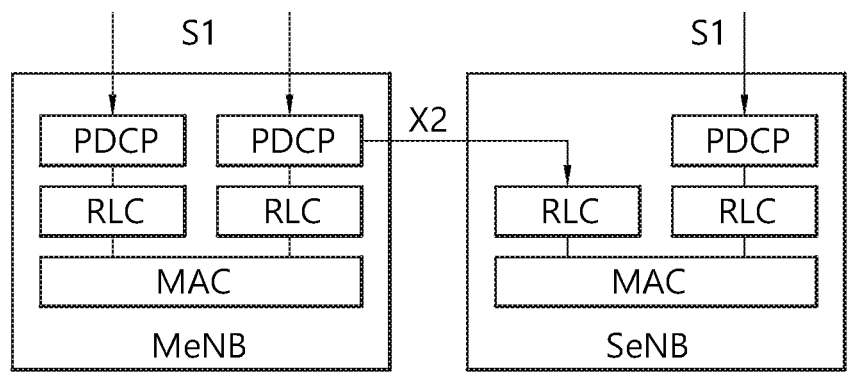
FIG. 6 shows radio protocol architecture for dual connectivity.

FIG. 6 shows radio protocol architecture for dual connectivity. In DC, the radio protocol architecture that a particular bearer uses depends on how the bearer is setup. Three alternatives exist, master cell group (MCG) bearer, secondary cell group (SCG) bearer and split bearer. Referring to FIG. 6, those three alternatives are depicted, i.e. in order of the MCG bearer, split bearer and SCG bearer from left to right. The MCG bearer is a bearer whose radio protocols are only located in the MeNB to use MeNB resources only in dual connectivity. The SCG bearer is a bearer whose radio protocols are only located in the SeNB to use SeNB resources in dual connectivity. The split bearer is a bearer whose radio protocols are located in both the MeNB and the SeNB to use both MeNB and SeNB resources in dual connectivity. Signaling radio bearers (SRBs) are always of the MCG bearer and therefore only use the radio resources provided by the MeNB. The MCG is a group of serving cells associated with the MeNB, comprising of the primary cell (PCell) and optionally one or more secondary cells (SCells) in dual connectivity. The SCG is a group of serving cells associated with the SeNB, comprising of primary SCell (PSCell) and optionally one or more SCells in dual connectivity. DC may also be described as having at least one bearer configured to use radio resources provided by the SeNB.

Figure 7:
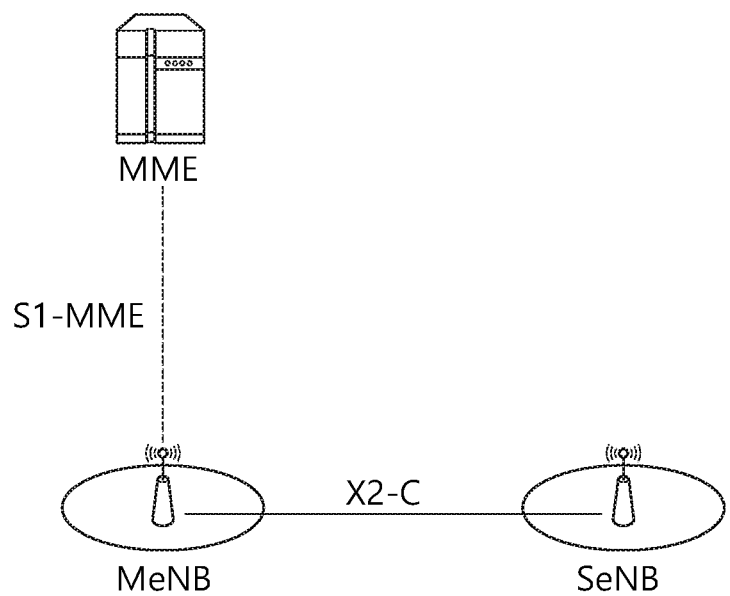
FIG. 7 shows C-plane connectivity of eNBs involved in dual connectivity for a certain UE.

FIG. 7 shows C-plane connectivity of eNBs involved in dual connectivity for a certain UE. Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling. Referring to FIG. 7, the MeNB is C-plane connected to the MME via S1-MME, the MeNB and the SeNB are interconnected via X2-C.

Figure 8:
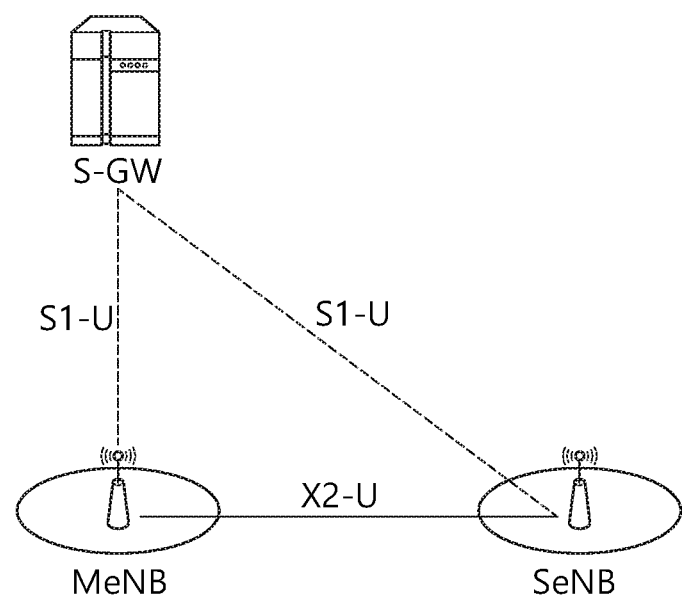
FIG. 8 shows U-plane connectivity of eNBs involved in dual connectivity for a certain UE.

FIG. 8 shows U-plane connectivity of eNBs involved in dual connectivity for a certain UE. U-plane connectivity depends on the bearer option configured. For MCG bearers, the MeNB is U-plane connected to the S-GW via S1-U, the SeNB is not involved in the transport of user plane data. For split bearers, the MeNB is U-plane connected to the S-GW via S1-U and in addition, the MeNB and the SeNB are interconnected via X2-U. For SCG bearers, the SeNB is directly connected with the S-GW via S1-U. If only MCG and split bearers are configured, there is no S1-U termination in the SeNB.

Figure 9:
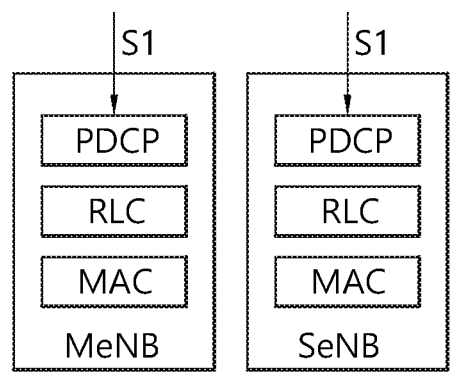
FIG. 9 shows an example of U-plane architecture for dual connectivity.

FIG. 9 shows an example of U-plane architecture for dual connectivity. U-plane architecture for dual connectivity shown in FIG. 9 is the combination of S1-U that terminates in SeNB and independent PDCPs (no bearer split).

Figure 10:
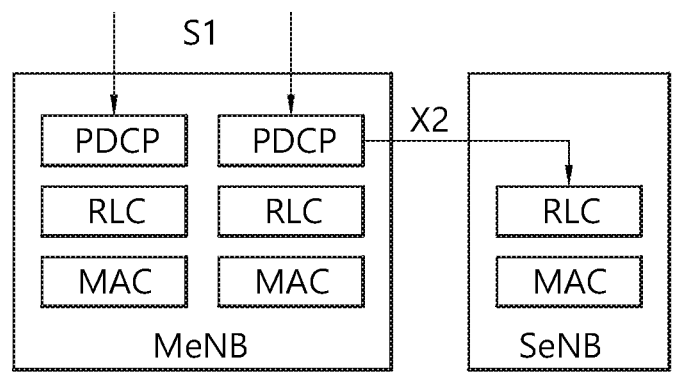
FIG. 10 shows another example of U-plane architecture for dual connectivity.

FIG. 10 shows another example of U-plane architecture for dual connectivity. U-plane architecture for dual connectivity shown in FIG. 10 is the combination of S1-U that terminates in MeNB, bearer split in MeNB, and independent RLCs for split bearers.

The corresponding UE architecture may be also changed to support the new feature.

Figure 11:
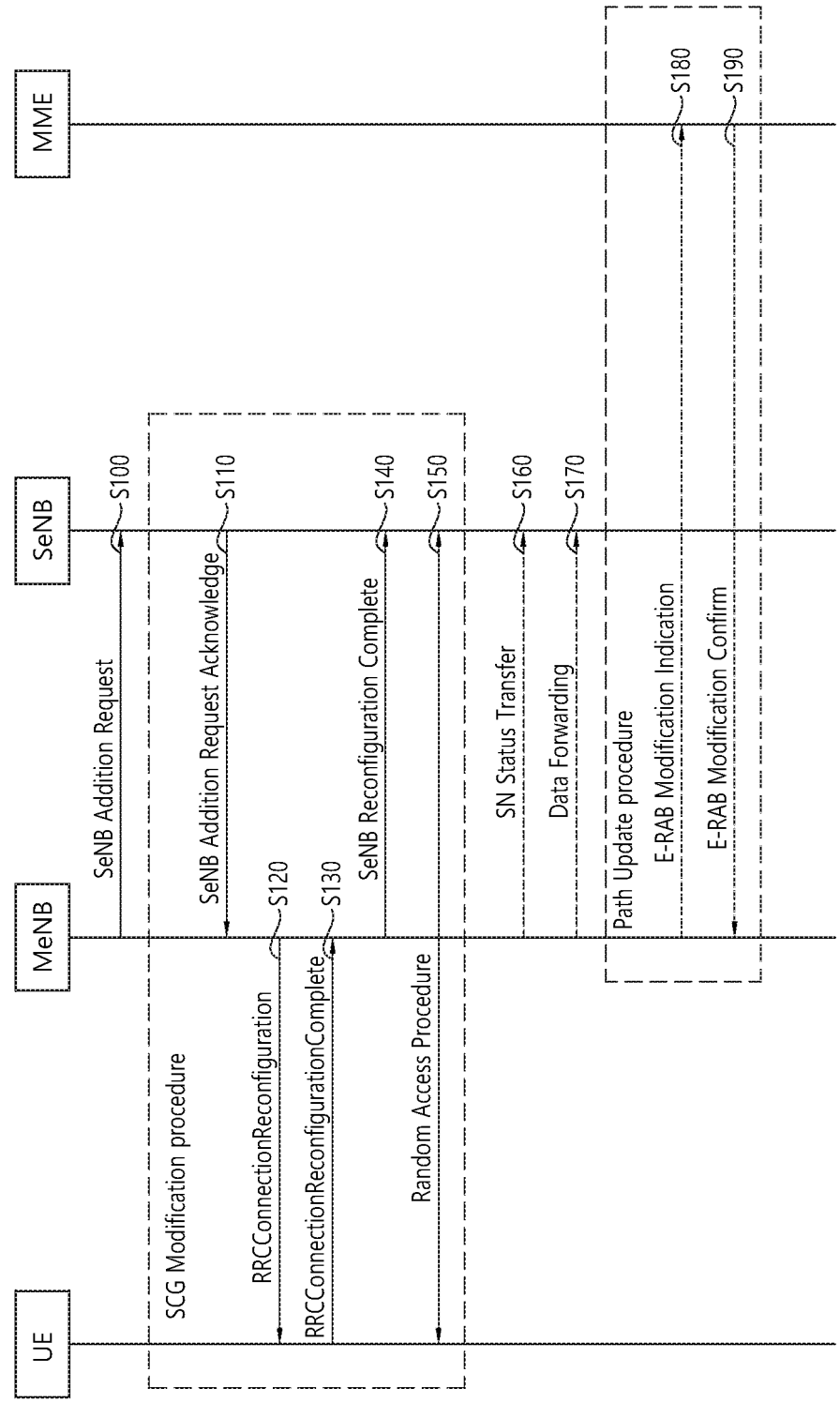
FIG. 11 shows a SeNB addition procedure for DC enhancement.

FIG. 11 shows a SeNB addition procedure for DC enhancement. The SeNB addition procedure is initiated by the MeNB and is used to establish a UE context at the SeNB in order to provide radio resources from the SeNB to the UE. This procedure is used to add at least the first cell (PSCell) of the SCG.

In step S100, the MeNB decides to request the SeNB to allocate radio resources for a specific E-UTRAN radio access bearer (E-RAB), indicating E-RAB characteristics (E-RAB parameters, transport layer network (TNL) address information corresponding to the UP option), by transmitting the SeNB Addition Request message to the SeNB. In addition, the MeNB indicates within SCG-ConfigInfo the MCG configuration (including security algorithm for SCG bearer) and the entire UE capabilities for UE capability coordination to be used as basis for the reconfiguration by the SeNB, but does not include SCG configuration. The MeNB can provide the latest measurement results for the SCG cell(s) requested to be added. The SeNB may reject the request. In contrast to SCG bearer, for the split bearer option, the MeNB may either decide to request resources from the SeNB of such an amount, that the quality of service (QoS) for the respective E-RAB is guaranteed by the exact sum of resources provided by the MeNB and the SeNB together, or even more. The MeNBs decision may be reflected in step S110 to be described below by the E-RAB parameters signaled to the SeNB, which may differ from E-RAB parameters received over S1. The MeNB may request the direct establishment of SCG or split bearer, i.e., without via MCG bearer.

If the radio resource management (RRM) entity in the SeNB is able to admit the resource request, the SeNB allocates respective radio resources and, dependent on the bearer option, respective transport network resources. The SeNB triggers random access so that synchronization of the SeNB radio resource configuration can be performed. In step S110, the SeNB provides the new radio resource of SCG in SCG-Config to the MeNB, by transmitting the SeNB Addition Request Acknowledge message to the MeNB. For SCG bearers, together with S1 DL transport network layer (TNL) address information for the respective E-RAB and security algorithm, for split bearers X2 DL TNL address information. In case of split bearers, transmission of user plane data may take place after step S110. In case of SCG bearers, data forwarding and the sequence number (SN) status transfer may take place after step S110.

If the MeNB endorses the new configuration, in step S120, the MeNB sends the RRCConnectionReconfiguration message to the UE including the new radio resource configuration of SCG according to the SCG-Config.

In step S130, the UE applies the new configuration, and replies with RRCConnectionReconfigurationComplete message. In case the UE is unable to comply with (part of) the configuration included in the RRCConnectionReconfiguration message, the UE performs the reconfiguration failure procedure.

In step S140, the MeNB informs the SeNB that the UE has completed the reconfiguration procedure successfully, by transmitting the SeNB Reconfiguration Complete message to the SeNB.

In step S150, the UE performs random access (RA) procedure towards the PSCell of the SeNB. The order the UE sends the RRCConnectionReconfigurationComplete message and performs the RA procedure towards the SCG is not defined. The successful RA procedure towards the SCG is not required for a successful completion of the RRC connection reconfiguration procedure.

In case SCG bearers, and dependent on the bearer characteristics of the respective E-RAB, the MeNB may take actions to minimize service interruption due to activation of dual connectivity. That is, in step S160, the MeNB may transmit the SN status transfer message to the SeNB. In step S170, the MeNB may perform data forwarding towards the SeNB.

Afterwards, for SCG bearers, the path update procedure towards the EPC is performed. During the path update procedure, the E-RAB modification indication procedure is performed. The purpose of the E-RAB modification indication procedure is to enable the eNB to request modifications of already established E-RABs for a given UE. The procedure uses UE-associated signaling. Specifically, in step S180, the MeNB may transmit the E-RAB Modification Indication message to the MME, in order to request the MME to apply the indicated modification for one or several E-RABs. The MeNB initiates the procedure by sending an E-RAB Modification Indication message to the MME. In step S190, the MME may transmit the E-RAB Modification Confirm message to the MeNB.

Table 1 shows an example of the E-RAB Modification Indication message. This message is sent by the eNB and is used to request the MME to apply the indicated modification for one or several E-RABs.

TABLE 1

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| E-RAB to be Modified List | | 1 | | | YES | reject |
| >E-RAB to Be Modified Item IEs | | 1 . . . <maxnoof E-RABs> | | | EACH | reject |
| >>E-RAB ID | M | | 9.2.1.2 | | — | |
| >>Transport Layer Address | M | | 9.2.2.1 | | — | |
| >>DL GTP TEID | M | | GTP-TEID 9.2.2.2 | | — | |
| E-RAB not to be Modified List | | 0 . . . 1 | | | YES | reject |
| >E-RAB not to Be Modified Item IEs | | 1 . . . <maxnoof E-RABs> | | | EACH | reject |
| >>E-RAB ID | M | | 9.2.1.2 | | — | |
| >>Transport Layer Address | M | | 9.2.2.1 | | — | |
| >>DL GTP TEID | M | | GTP-TEID 9.2.2.2 | | — | |

Referring to Table 1, the E-RAB Modification Indication message includes both the E-RAB to be Modified List information element (IE), which indicates a list of E-RABs to be modified, and the E-RAB not to be Modified List IE, which indicates a list of E-RABs not to be modified. The Transport Layer Address IE and DL GPRS tunneling protocol (GTP) tunnel ID (TEID) IE included in the E-RAB To Be Modified Item IEs IE in the E-RAB Modification Indication message shall be considered by the MME as the new DL address of the E-RABs. The Transport Layer Address IE and DL GTP TEID IE included in the E-RAB Not To Be Modified Item IEs IE in the E-RAB Modification Indication message shall be considered by the MME as the E-RABs with unchanged DL address.

The E-RAB Modification Confirm message shall contain the result for all the E-RABs that were requested to be modified according to the E-RAB To Be Modified Item IEs IE of the E-RAB MODIFICATION INDICATION message.

In certain situations, E-RAB switch failure may happen in the S-GW for all of E-RABs or partial E-RABs. Currently, when the E-RAB switch failure happens, the MME may release the corresponding E-RAB or trigger the detach procedure if switch of all new TEIDs fails. However, for DC, the action and behavior for solving the E-RAB switch failure may be different for S-GW/MME/MeNB, but, there is no detailed solution yet.

In order to solve problem the described above, a method for handling E-RAB switch failure for DC according to an embodiment of the present invention may be proposed. According to an embodiment of the present invention, if a list of E-RABs failed to switch is received, the MeNB may keep old transport path for the failed E-RABs and trigger the SeNB release procedure. Alternatively, if a list of E-RABs failed to switch is received, the MeNB may trigger the E-RAB release procedure for the failed E-RABs. The embodiments of the present invention described below may be applied to two cases. Case 1 may correspond to the SeNB addition/modification procedure in which E-RABs are added to the SeNB. Case 2 corresponds to the SeNB modification/release procedure in which some E-RAB(s) are taken back from the SeNB.

Figure 12:
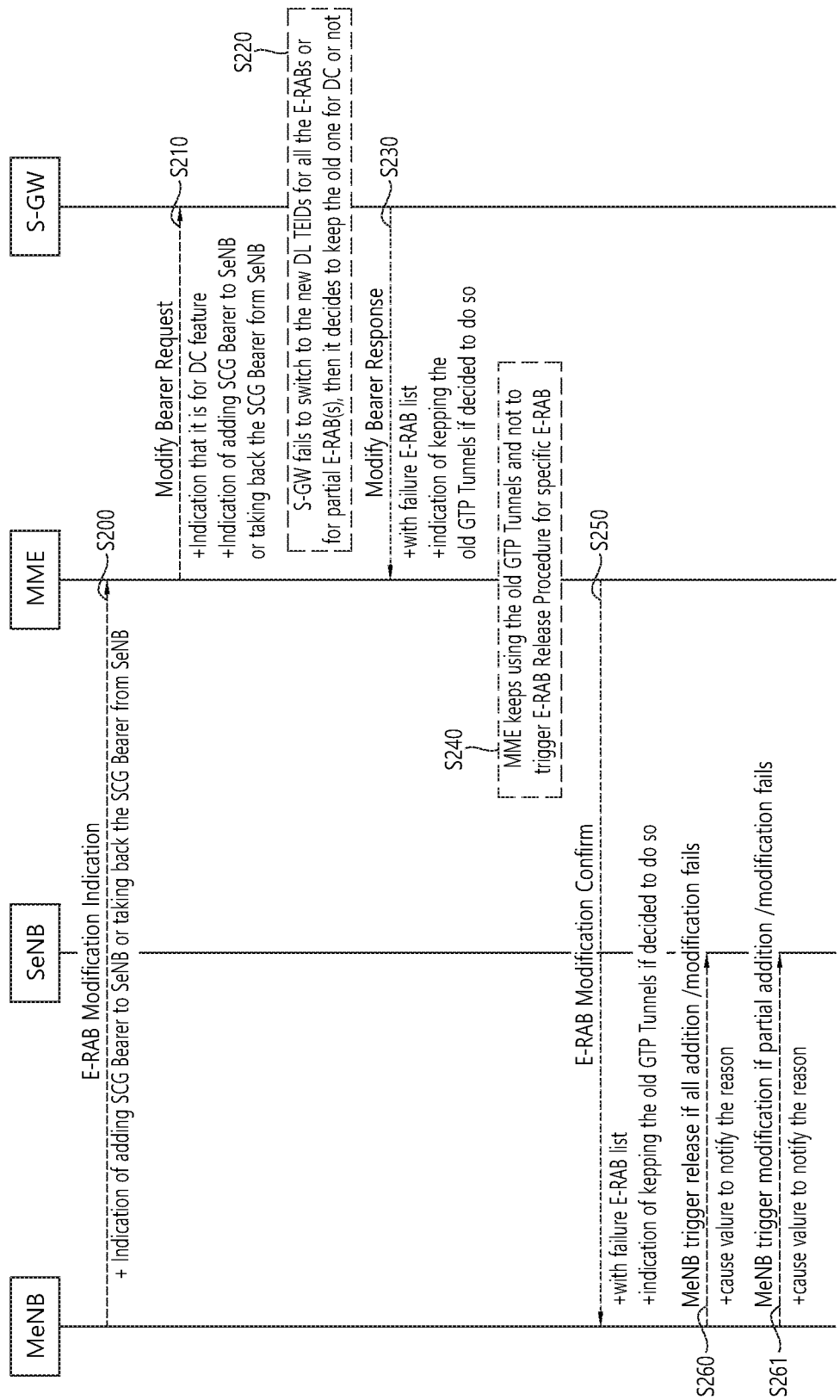
FIG. 12 shows an example of a method for handling E-RAB switch failure according to an embodiment of the present invention.

FIG. 12 shows an example of a method for handling E-RAB switch failure according to an embodiment of the present invention. It is assumed that the SeNB addition procedure corresponding to steps S100 to S170 shown in FIG. 11 are already performed. FIG. 12 only shows the following procedures according to an embodiment of the present invention. According to an embodiment of FIG. 12, old GTP tunnels may be kept.

In step S200, the MeNB transmits the E-RAB Modification Indication message to the MME to request the MME to apply the indicated modification for one or several E-RABs. The E-RAB Modification Indication message may follow Table 1 shown above. That is, the E-RAB Modification Indication message includes both the E-RAB to be Modified List IE and the E-RAB not to be Modified List IE. The E-RAB Modification Indication message may further include an indication of case 1, i.e. adding the SCG bearer to the SeNB, or case 2, i.e. taking back the SCG bearer from the SeNB.

Upon receiving the E-RAB Modification Indication message, the MME checks the both the E-RAB to be Modified List IE and the E-RAB not to be Modified List IE. The MME may check the indication in the E-RAB Modification Indication message. In step S210, the MME transmits the Modify Bearer Request message to the S-GW. The Modify Bearer Request message may include an indication indicating that it is for DC feature. The Modify Bearer Request message may further include an indication of case 1, i.e. adding the SCG bearer to the SeNB, or case 2, i.e. taking back the SCG bearer from the SeNB.

In step S220, if the S-GW fails to switch to the new DL TEIDs for all of E-RABs or for partial E-RAB(s), then the S-GW decides to keep the old GTP tunnels for DC or not based on the indication.

In step S230, the S-GW transmits the Modify Bearer Response message to the MME. The Modify Bearer Response message may include a list of E-RABs failed to switch. The Modify Bearer Response message may further include a cause value for the failure. The Modify Bearer Response message may further include an indication of keeping the old GTP tunnels.

In step S240, upon receiving the Modify Bearer Response message, the MME keeps using the old GTP tunnels are kept and does not trigger the E-RAB release procedure for the failed E-RABs.

In step S250, the MME transmit the E-RAB Modification Confirm message to the MeNB. The E-RAB Modification Confirm message may include a list of E-RABs failed to switch. The E-RAB Modification Confirm message may further include a cause value for the failure. The E-RAB Modification Confirm message may further include an indication of keeping the old GTP tunnels.

Table 2 shows an example of the E-RAB Modification Confirm message according to an embodiment of the present invention. This message is sent by the MME and is used to report the outcome of the request from the E-RAB Modification Indication message.

TABLE 2

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | ignore |
| eNB UE S1AP ID | M | | 9.2.3.4 | | YES | ignore |
| E-RAB Modify List | | 0 . . . 1 | | | YES | ignore |
| >E-RAB Modify Item IEs | | 1 . . . <maxnoof E-RABs> | | | EACH | ignore |
| >>E-RAB ID | M | | 9.2.1.2 | | — | |
| E-RAB Failed to Modify List | O | | E-RAB List 9.2.1.36 | A value for E-RAB ID shall only be present once in E-RAB Modify List IE + E-RAB Failed to Modify List IE. | YES | ignore |
| Criticality Diagnostics | O | | 9.2.1.21 | | YES | ignore |

Referring to Table 2, the E-RAB Modification Confirm message includes the E-RAB Failed to Modify List IE, which corresponds to a list of E-RABs failed to switch described above.

Upon receiving the E-RAB Modification Confirm message, the MeNB notifies the failure and the old GTP tunnels are kept. In step S260, the MeNB triggers the SeNB release procedure if all addition/modification of E-RABs fails. The cause value to notify the reason of the failure may informed to the SeNB. Or, in step S261, the MeNB triggers the SeNB modification procedure if partial addition/modification of E-RABs fails. The cause value to notify the reason of the failure may informed to the SeNB. In this case, the E-RAB modification indication procedure may not be triggered.

In the SeNB release procedure, the old GTP tunnels are allocated from the SeNB, and the new GTP tunnels are allocated by the MeNB. If failure happens, which means that the MeNB makes a mistake, the S-GW may not keep the old GTP tunnels, following that MME may trigger the E-RAB release procedure. Or, the MeNB may trigger the E-RAB release procedure. Or, the MeNB may transmit the E-RAB Modification Indication message again with new DL GTP tunnels to the MME if the S-GW/MME does not trigger the E-RAB release procedure.

Figure 13:
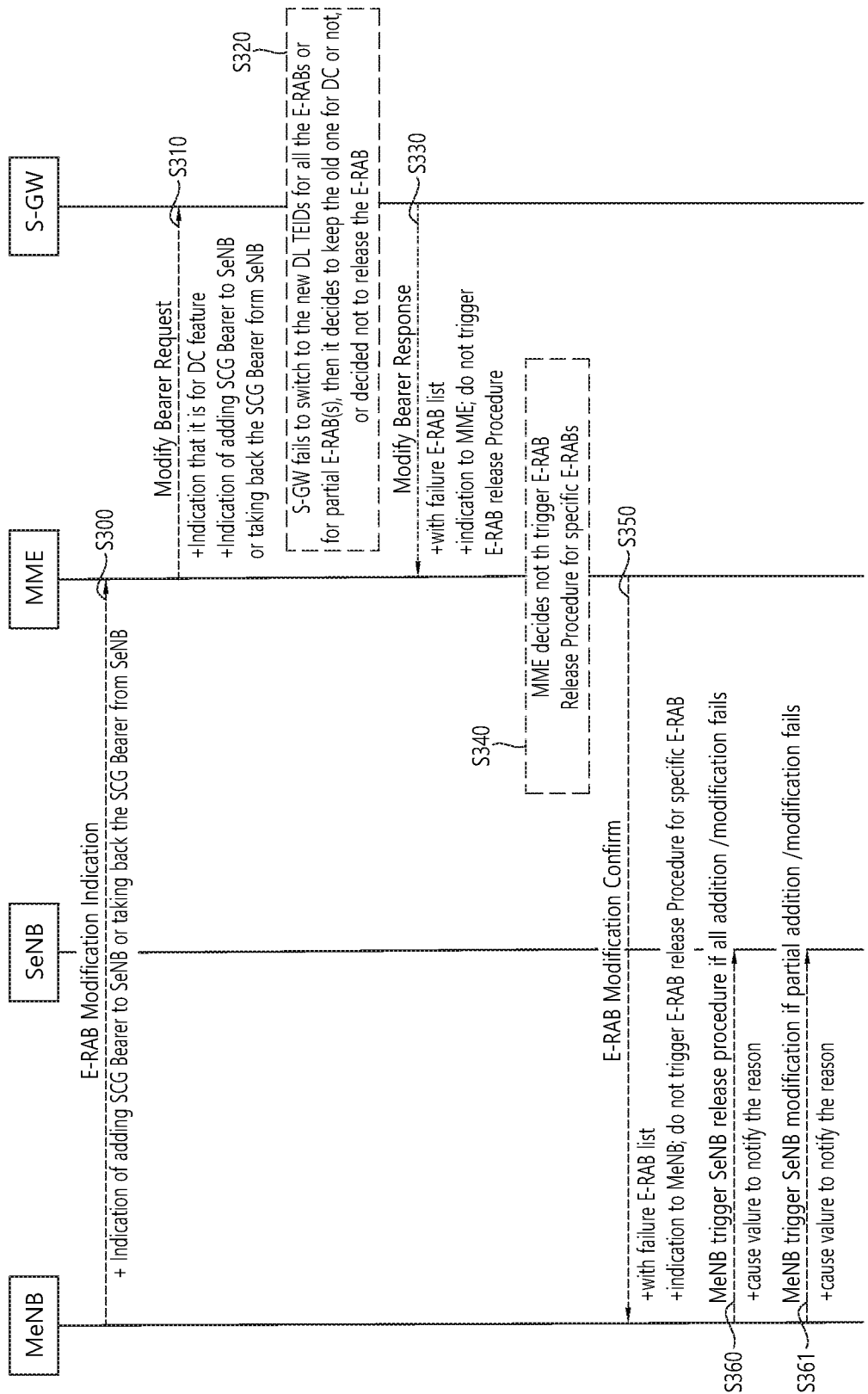
FIG. 13 shows another example of a method for handling E-RAB switch failure according to an embodiment of the present invention.

FIG. 13 shows another example of a method for handling E-RAB switch failure according to an embodiment of the present invention. It is assumed that the SeNB addition procedure corresponding to steps S100 to S170 shown in FIG. 11 are already performed. FIG. 13 only shows the following procedures according to an embodiment of the present invention. According to an embodiment of FIG. 13, the E-RAB modification indication procedure may be triggered again, by the SeNB modification/release procedure or individually.

In step S300, the MeNB transmits the E-RAB Modification Indication message to the MME to request the MME to apply the indicated modification for one or several E-RABs. The E-RAB Modification Indication message may follow Table 1 described above. That is, the E-RAB Modification Indication message includes both the E-RAB to be Modified List IE and the E-RAB not to be Modified List IE. The E-RAB Modification Indication message may further include an indication of case 1, i.e. adding the SCG bearer to the SeNB, or case 2, i.e. taking back the SCG bearer from the SeNB.

Upon receiving the E-RAB Modification Indication message, the MME checks the both the E-RAB to be Modified List IE and the E-RAB not to be Modified List IE. The MME may check the indication in the E-RAB Modification Indication message. In step S310, the MME transmits the Modify Bearer Request message to the S-GW. The Modify Bearer Request message may include an indication indicating that it is for DC feature. The Modify Bearer Request message may further include an indication of case 1, i.e. adding the SCG bearer to the SeNB, or case 2, i.e. taking back the SCG bearer from the SeNB.

In step S320, if the S-GW fails to switch to the new DL TEIDs for all of E-RABs or for partial E-RAB(s), then the S-GW decides to keep the old GTP tunnels for DC or not based on the indication, or decides not to release the failed E-RABs.

In step S330, the S-GW transmits the Modify Bearer Response message to the MME. The Modify Bearer Response message may include a list of E-RABs failed to switch. The Modify Bearer Response message may further include a cause value for the failure. The Modify Bearer Response message may further include an indication of keeping the old GTP tunnels, and/or indication of not triggering the E-RAB release procedure for the failed E-RABs.

In step S340, upon receiving the Modify Bearer Response message or by itself, the MME decides not to trigger the E-RAB release procedure for the failed E-RABs.

In step S350, the MME transmit the E-RAB Modification Confirm message to the MeNB. The E-RAB Modification Confirm message may include a list of E-RABs failed to switch. The E-RAB Modification Confirm message may further include a cause value for the failure. The E-RAB Modification Confirm message may further include an indication of keeping the old GTP tunnels, and/or indication of not triggering the E-RAB release procedure the failed E-RABs. The E-RAB Modification Confirm message may follow Table 2 described above.

Upon receiving the E-RAB Modification Confirm message, the MeNB recognizes the failure and the old GTP tunnels are kept. Or, the MeNB should not trigger the E-RAB release procedure the failed E-RABs. In step S360, the MeNB triggers the SeNB release procedure if all addition/modification of E-RABs fails. The cause value to notify the reason of the failure may informed to the SeNB. Or, in step S361, the MeNB triggers the SeNB modification procedure if partial addition/modification of E-RABs fails. The cause value to notify the reason of the failure may informed to the SeNB.

Within the procedures above, the E-RAB modification indication procedure towards the MME may be included. Or, the MeNB may trigger the E-RAB modification indication procedure individually to the MME. Then, the MME may perform the modify bearer procedure to the S-GW again to renew the service again.

In the SeNB release procedure, the old GTP tunnels are allocated from the SeNB, and the new GTP tunnels are allocated by the MeNB. If failure happens, which means that the MeNB makes a mistake, the S-GW may not keep the old GTP tunnels, following that MME may trigger the E-RAB release procedure. Or, the MeNB may trigger the E-RAB release procedure. Or, the MeNB may transmit the E-RAB Modification Indication message again with new DL GTP tunnels to the MME if the S-GW/MME does not trigger the E-RAB release procedure.

Figure 14:
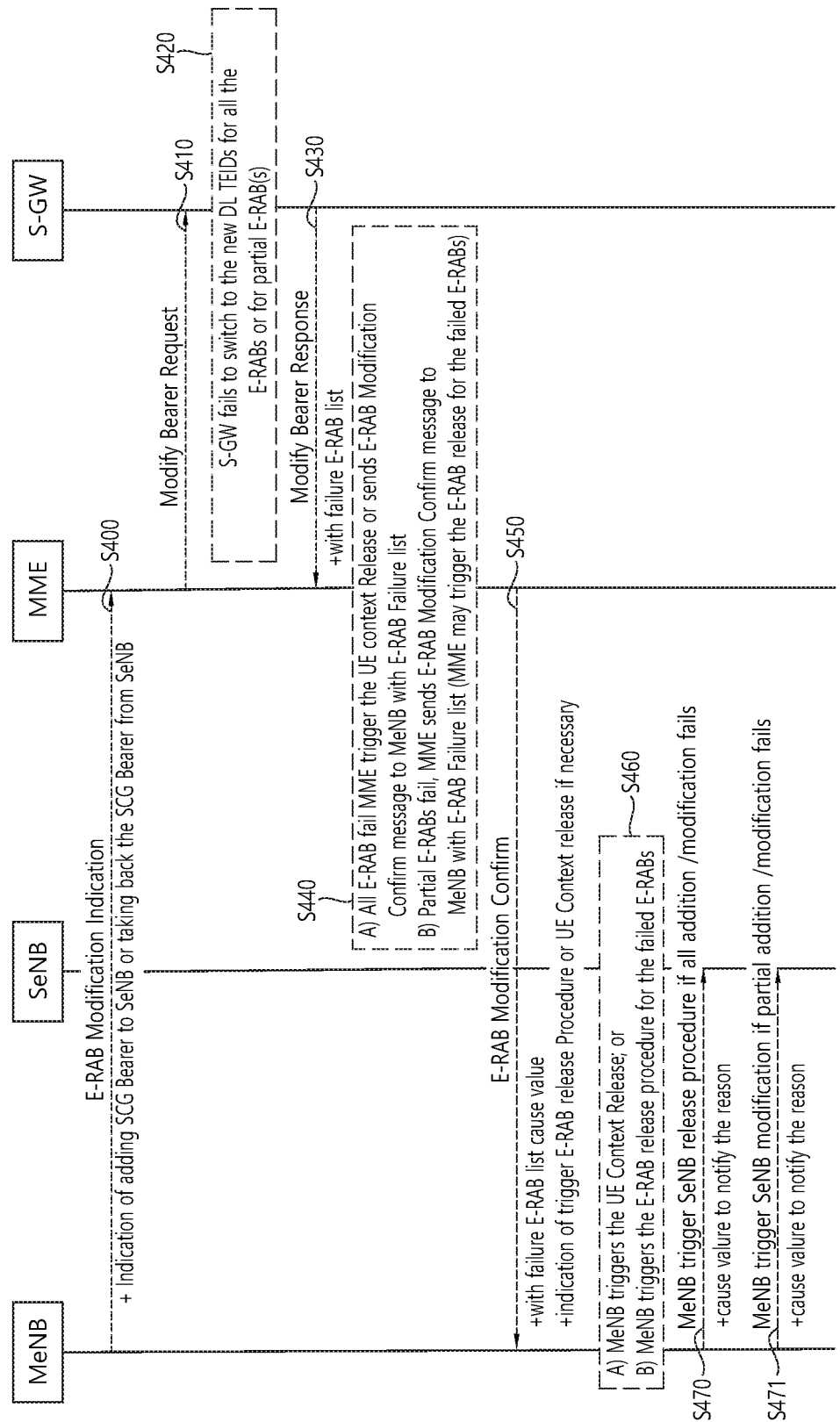
FIG. 14 shows another example of a method for handling E-RAB switch failure according to an embodiment of the present invention.

FIG. 14 shows another example of a method for handling E-RAB switch failure according to an embodiment of the present invention. It is assumed that the SeNB addition procedure corresponding to steps S100 to S170 shown in FIG. 11 are already performed. FIG. 14 only shows the following procedures according to an embodiment of the present invention. An embodiment of FIG. 14 is similar to the legacy principle In step S400, the MeNB transmits the E-RAB Modification Indication message to the MME to request the MME to apply the indicated modification for one or several E-RABs. The E-RAB Modification Indication message may follow Table 1 described above. That is, the E-RAB Modification Indication message includes both the E-RAB to be Modified List IE and the E-RAB not to be Modified List IE. The E-RAB Modification Indication message may further include an indication of case 1, i.e. adding the SCG bearer to the SeNB, or case 2, i.e. taking back the SCG bearer from the SeNB.

Upon receiving the E-RAB Modification Indication message, the MME checks the both the E-RAB to be Modified List IE and the E-RAB not to be Modified List IE. The MME may check the indication in the E-RAB Modification Indication message. In step S410, the MME transmits the Modify Bearer Request message to the S-GW. The Modify Bearer Request message may include an indication indicating that it is for DC feature. The Modify Bearer Request message may further include an indication of case 1, i.e. adding the SCG bearer to the SeNB, or case 2, i.e. taking back the SCG bearer from the SeNB.

In step S420, the S-GW fails to switch to the new DL TEIDs for all of E-RABs or for partial E-RAB(s).

In step S430, the S-GW transmits the Modify Bearer Response message to the MME. The Modify Bearer Response message may include a list of E-RABs failed to switch. The Modify Bearer Response message may further include a cause value for the failure.

In step S440, the MME performs one of followings:
  If all of E-RABs have the new TEIDs (which means that all of E-RAB are added to the SeNB) and all of E-RABs fails to switch, the MME may trigger the UE context release procedure directly.

If all of E-RABs have the new TEIDs (which means that all of E-RAB are added to the SeNB) and all of E-RABs fails to switch, the MME may transmit the E-RAB Modification Confirm message to the MeNB. The E-RAB Modification Confirm message will be described below in detail. Then, the MeNB may trigger the UE context release procedure.

If partial E-RABs fails to switch, the MME may transmit the E-RAB Modification Confirm message to the MeNB. The E-RAB Modification Confirm message will be described below in detail. The MME may trigger the E-RAB release procedure for the failed E-RABs.

If Partial E-RABs fail to switch, the MME may transmit the E-RAB Modification Confirm message to the MeNB. The E-RAB Modification Confirm message will be described below in detail. The MeNB may trigger the E-RAB release procedure for the failed E-RABs.

In step S450, the MME transmits the E-RAB Modification Confirm Message to the MeNB. The E-RAB Modification Confirm message may include a list of E-RABs failed to switch. The E-RAB Modification Confirm message may further include a cause value for the failure. The E-RAB Modification Confirm message may further include an indication of triggering the E-RAB release procedure or the UE context release procedure if necessary. The E-RAB Modification Confirm message may follow Table 2 described above.

Upon receiving the E-RAB Modification Confirm message, in step S460, the MeNB recognizes the failure situation and may perform one of followings:

The MeNB may trigger the UE context release procedure if all of E-RABs fail

The MeNB may trigger the E-RAB release procedure for the failed E-RABs.

In step S470, the MeNB triggers the SeNB release procedure if all addition/modification of E-RABs fails. The cause value to notify the reason of the failure may informed to the SeNB. Or, in step S471, the MeNB triggers the SeNB modification procedure if partial addition/modification of E-RABs fails. The cause value to notify the reason of the failure may informed to the SeNB.

Figure 15:
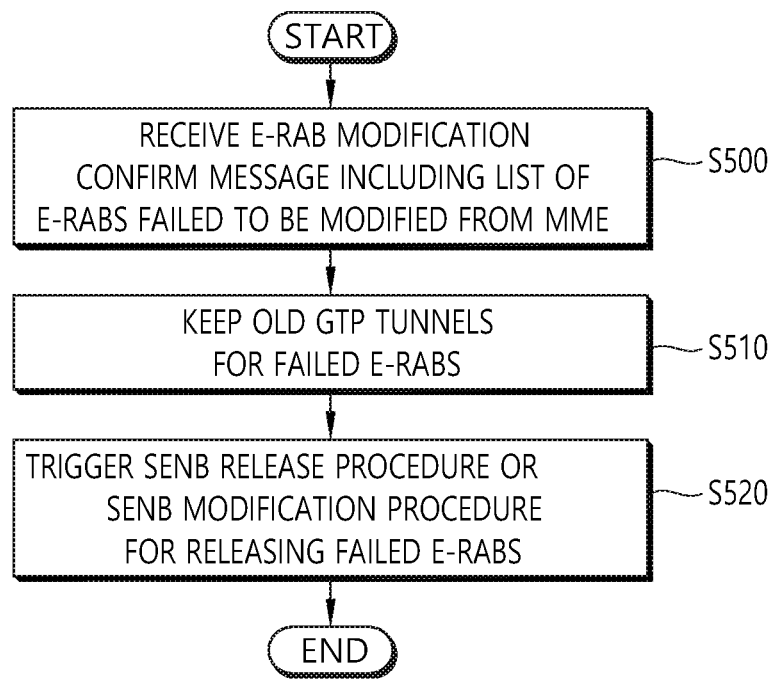
FIG. 15 shows another example of a method for handling E-RAB switch failure according to an embodiment of the present invention.

FIG. 15 shows another example of a method for handling E-RAB switch failure according to an embodiment of the present invention. In step S500, the MeNB in dual connectivity receives an E-RAB modification confirm message including a list of E-RABs failed to be modified from a MME. In step S510, the MeNB keeps old GTP tunnels for the failed E-RABs, and in step S520, triggers a SeNB release procedure or a SeNB modification procedure for releasing the failed E-RABs. The E-RAB modification confirm message may further include an indication of keeping the old GTP tunnels for the failed E-RABs. The E-RAB modification confirm message may further include a cause value for the failure. A UE may be connected to both the MeNB and a SeNB in the dual connectivity. The MeNB may further transmit an E-RAB modification indication message to the MME. The E-RAB modification indication message may include both a list of E-RABs to be modified and a list of E-RABs not to be modified. The E-RAB modification indication message may include an indication of whether a SCG bearer is added to a SeNB or the SCG bearer is taken from the SeNB.

Figure 16:
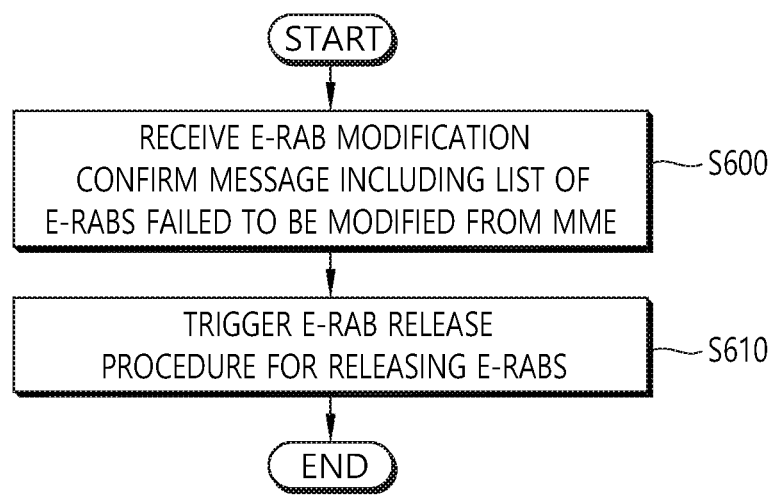
FIG. 16 shows another example of a method for handling E-RAB switch failure according to an embodiment of the present invention.

FIG. 16 shows another example of a method for handling E-RAB switch failure according to an embodiment of the present invention. In step S600, the MeNB in dual connectivity receives an E-RAB modification confirm message including a list of E-RABs failed to be modified from a MME. In step S610, the MeNB triggers an E-RAB release procedure for releasing the failed E-RABs. The E-RAB modification confirm message may further include an indication of triggering the E-RAB release procedure the failed E-RABs. The E-RAB modification confirm message may further include a cause value for the failure. A UE may be connected to both the MeNB and a SeNB in the dual connectivity. The MeNB may further transmit an E-RAB modification indication message to the MME. The E-RAB modification indication message may include both a list of E-RABs to be modified and a list of E-RABs not to be modified. The E-RAB modification indication message may include an indication of whether a SCG bearer is added to a SeNB or the SCG bearer is taken from the SeNB. The MeNB may further trigger a UE context release procedure for the failed E-RABs.

Consequently, according to an embodiment of the present invention, if a list of E-RABs failed to switch is received in E-RAB Modification Confirm message, the MeNB may keep the previous transport information before transmitting the E-RAB Modification Indication message unchanged for the concerned E-RAB, and if applicable, may trigger to release the corresponding SCG bearers. Alternatively, if a list of E-RABs failed to switch is received in E-RAB Modification Confirm message, the MeNB may release all corresponding resources for the concerned E-RAB.

Figure 17:
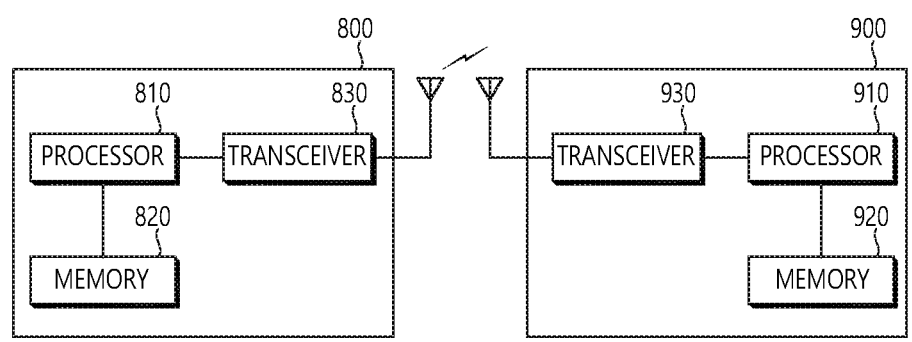
FIG. 17 shows a wireless communication system to implement an embodiment of the present invention.

FIG. 17 shows a wireless communication system to implement an embodiment of the present invention.

A MME 800 includes a processor 810, a memory 820, and a transceiver 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A MeNB in dual connectivity 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for operating a master node in dual connectivity, the method comprising:
   transmitting, by the master node, a first message to a mobility managemnet entity (MME),
   wherein the first message includes a list of E-UTRAN radio access bearers (E-RABs) to be modified and a list of E-RABs not to be modified;
   receiving, by the master node, a second message from the MME in response to the first message,
   wherein the second message includes a list of E-RABs failed to be modified;
   keeping, by the master node, previously established general packet radio service (GPRS) tunneling protocol (GTP) tunnels for the E-RABs failed to be modified; and
   triggering, by the master node, a secondary node modification procedure for the E-RABs failed to be modified,
   wherein a user equipment (UE) is connected to both the master node and a secondary node in dual connectivity.

2. The method of claim 1, wherein the master node is a master eNodeB (MeNB).

3. The method of claim 1, wherein the secondary node is a secondary eNodeB (SeNB).

4. The method of claim 1, wherein the second message is an E-RAB modification confirm message.

5. The method of claim 4, wherein the E-RAB modification confirm message further includes information on triggering the secondary node modification procedure for the E-RABs failed to be modified.

6. The method of claim 4, wherein the E-RAB modification confirm message further includes a cause value for a failure.

7. The method of claim 1, wherein the first message is an E-RAB modification indication message.

8. A master node in dual connectivity, the master node comprising:
   a memory;
   a transceiver; and
   a processor, operatively coupled to the memory and the transceiver, and configured to:
      control the transceiver to transmit a first message to a mobility management entity (MME),
      wherein the first message includes a list of E-UTRAN radio access bearers (E-RABs) to be modified and a list of E-RABs not to be modified,
      control the transceiver to receive a second message from the MME in a response to the first message, wherein the message includes a list of E-RABs failed to be modified,
      keep previously established general packet radio service (GPRS) tunneling protocol (GTP) tunnels for the E-RABs failed to be modified, and
      triggers a secondary node modification procedure for the E-RABs failed to be modified,
      wherein a user equipment (UE) is connected to both the master node and a secondary node in dual connectivity.

9. The master node of claim 8, wherein the master node is a master eNodeB (MeNB).

10. The master node of claim 8, wherein the secondary node is a secondary eNodeB (SeNB).

11. The master node of claim 8, wherein the second message is an E-RAB modification confirm message.

12. The master node of claim 11, wherein the E-RAB modification confirm message further includes information on triggering the secondary node modicfcation for the E-RABs failed to be modified.

13. The master node of claim 11, wherein the E-RAB modification confirm message further includes a cause value for a failure.

14. The master node of claim 8, wherein the first message is an E-RAB modification indication message.

* * * * *